United States Patent [19]

Fudickar et al.

[11] Patent Number: 4,554,043
[45] Date of Patent: Nov. 19, 1985

[54] BELT PRESS WITH MULTIPLE PRESS FRAMES

[75] Inventors: Harald Fudickar, Wuppertal; Peter Thies, Ennepetal, both of Fed. Rep. of Germany

[73] Assignee: Wagener Schwelm GmbH & Co., Schwelm, Fed. Rep. of Germany

[21] Appl. No.: 618,503

[22] Filed: Jun. 8, 1984

[30] Foreign Application Priority Data

Jun. 9, 1983 [DE] Fed. Rep. of Germany ....... 3320784

[51] Int. Cl.⁴ .............................................. B30B 15/06
[52] U.S. Cl. .................................. 156/502; 100/93 P; 100/269 A; 100/270; 156/304.6; 156/583.1
[58] Field of Search ............ 100/93 P, 258 R, 258 A, 100/269 A, 270, 290, 295; 156/583.1, 304.1, 304.6, 502; 425/338, 343, 384, 385, 394, 406, 410

[56] References Cited

U.S. PATENT DOCUMENTS

| | | | |
|---|---|---|---|
| 3,775,588 | 11/1973 | Niehenke | 100/93 P X |
| 3,977,535 | 8/1976 | Husges et al. | 100/93 P X |
| 4,083,205 | 4/1978 | Clarke et al. | 100/93 P X |
| 4,388,860 | 6/1983 | Thies | 100/93 P X |
| 4,393,674 | 7/1983 | Rasmussen | 73/49.5 X |
| 4,423,674 | 1/1984 | Thies | 100/93 P X |
| 4,426,573 | 1/1984 | Fudickar et al. | 53/557 X |

Primary Examiner—Billy J. Wilhite
Attorney, Agent, or Firm—Karl F. Ross; Herbert Dubno

[57] ABSTRACT

A belt press is formed of a longitudinal row of upright and abutting press frames each comprising upper and lower traverses respectively having lower and upper traverse faces and two upright tie bolts extending vertically between the upper and lower traverses and securing the lower traverse to the upper traverse. Upper and lower press platens carried on and between the traverses have respective upper and lower platen faces respectively confronting the lower and upper traverse faces. A belt workpiece to be joined or repaired is engaged between the platens. Respective upper and lower pressure plates engaged between the platen faces and the respective traverse faces have respective upper and lower heaters. Hydraulic actuators engaged between the upper traverse and the upper pressure plate are vertically expansible for displacing the upper pressure plate down and thereby pressing the platens against a belt engaged therebetween. The upper pressure plate is of U-section and upwardly open with a base lying on the upper pressure plate and a pair of sides projecting upward therefrom. The hydraulic actuators are between the pressure-plate sides and are constituted as at least one diametrally compressible but circumferentially unstretchable hydraulic hose forming a substantially closed chamber and lying between the pressure-plate sides.

16 Claims, 3 Drawing Figures

4,554,043

BELT PRESS WITH MULTIPLE PRESS FRAMES

FIELD OF THE INVENTION

The present invention relates to a belt press. More particularly this invention concerns a press frame from which a belt press is constructed.

BACKGROUND OF THE INVENTION

A standard belt press used for joining and repairing wide flat belts has a plurality of upper and a plurality of lower traverses respectively having lower and upper traverse faces and upper and lower press platens carried on and between the traverses and having respective upper and lower platen faces respectively confronting the lower and upper traverse faces. Upright tie rods have their upper ends secured in the upper traverse and their lower ends in the lower traverse and can be tightened to move the two platens into a starting position.

A belt to be pressed is engaged between the platens. At least one bend-compensating element having a pair of nonparallel upper and lower surfaces is engaged between one of the platen faces and the confronting traverse faces. A hydraulic actuator is normally braced between the bend-compensating element and one the respective press and platen faces. This actuator can be expanded to move the respective platen toward the other platen.

In order to achieve a smooth finish when vulcanizing a belt, the press platens are longitudinally throughgoing, that is they are of one piece and extend all the way through the press. Heating elements such as described in commonly owned patent application Ser. No. 329,571 filed Dec. 10, 1981 by C. Fudickar (now U.S. Pat. No. 4,426,573) are imbedded in the press platens, which are formed as thick plates. In addition it is standard to integrate the actuators in the thick press platens, and further to build in the various pressure sensors, temperature sensors, and so on that the process requires.

Thus a platen press is normally only available in certain standard sizes, determined by the sizes of the platens available. Even when the platens are formed as separate pieces that each extend longitudinally through several frames, construction is complex and inefficient.

OBJECTS OF THE INVENTION

It is therefore an object of the present invention to provide an improved belt press.

Another object is the provision of such a belt press which overcomes the above-given disadvantages, that is which is of simple and efficient construction.

SUMMARY OF THE INVENTION

A belt press according to the invention is formed of a longitudinal row of upright and abutting press frames each comprising upper and lower traverses respectively having lower and upper traverse faces and two upright tie bolts extending vertically between the upper and lower traverses and securing the lower traverse to the upper traverse. Upper and lower press platens carried on and between the traverses have respective upper and lower platen faces respectively confronting the lower and upper traverse faces. A belt workpiece to be joined or repaired is engaged between the platens. Respective upper and lower pressure plates engaged between the platen faces and the respective traverse faces have built-in respective upper and lower heaters. Hydraulic actuators engaged between the upper traverse and the upper pressure plate are vertically expansible for displacing the upper pressure plate down and thereby pressing the platens against a belt engaged therebetween.

Thus with the system of this invention the only parts that need be custom-made for a given press length are the press platens which can be fairly thin and easy to cut to length, as the upper and lower pressure plates actually or nearly abut one another longitudinally to form continuous or nearly continuous upper and lower pressure-plate surfaces. The platen thickness is determined by the space, if any, between longitudinally adjacent pressure plates.

Since pressure plates are used with integrated heaters, it is possible according to another feature of this invention to make the platens of sheet metal, as this increases heat transfer and allows considerable compression to be withstood. The modular construction of this invention allows a belt press to be constructed of any size at low cost. The individual heaters and actuators can all be hooked together and operated jointly, or separately, as conditions require.

According to a feature of the invention the upper pressure plate is of U-section and upwardly open with a base lying on the upper pressure plate and a pair of sides projecting upward therefrom. The hydraulic actuators are between the pressure-plate sides and are constituted as at least one diametrically compressible but circumferentially unstretchable hydraulic hose forming a substantially closed chamber and lying between the pressure-plate sides. These hoses extend parallel to the respective traverses and transverse to the row of frames and hoses of each of the upper pressure plates engage each other laterally. A pump is connected to all of the chambers for pressurizing same. Since the effective surface area of the actuators is great, it is possible to work with standard hydraulics and bring considerable pressure to bear on the workpiece. In addition when the chambers are partially filled with a compressible gas, it is possible to achieve extremely uniform pressure over the entire press on the workpiece.

In accordance with further features of the invention, each of the pressure plates includes a heating bar in which the respective heater is contained. In addition each pressure plate with the respective heating bar is at least four times thicker, measured vertically, than the respective platen. These relatively thin press platens have bent ends engaging horizontally against the frame at the end of the row of frames. The heaters themselves are provided with temperature self-regulating heating capsules and include elongated heater bodies in which the capsules are imbedded. The pressure plates each include a rigid heater bar having a throughgoing passage receiving the respective heater bodies are fitted.

DESCRIPTION OF THE DRAWING

The above and other features and advantages will become more readily apparent from the following, in which.

SPECIFIC DESCRIPTION

Figure 1:
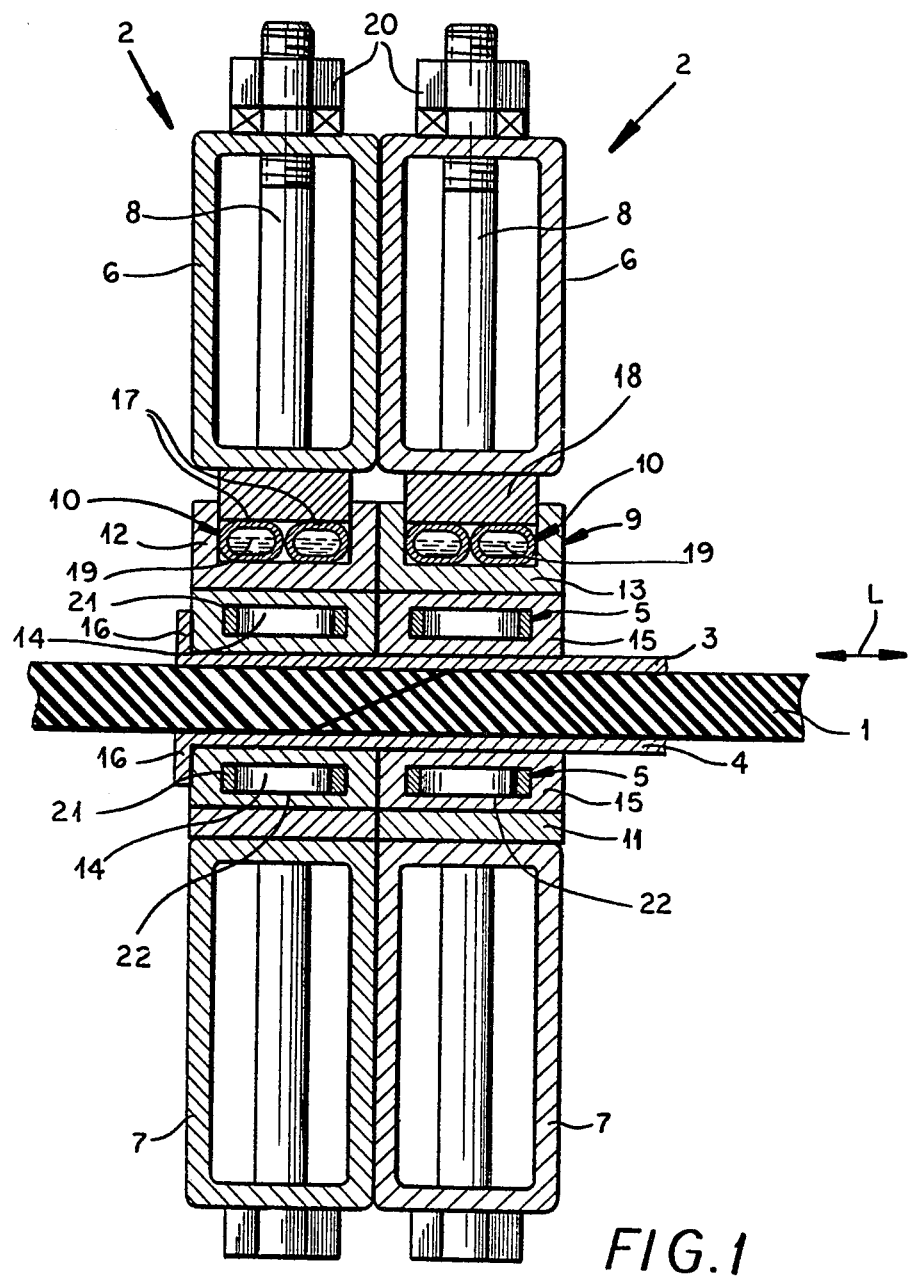
FIG. 1 is a vertical and longitudinal section through the end of a press according to this invention.
Figure 2:
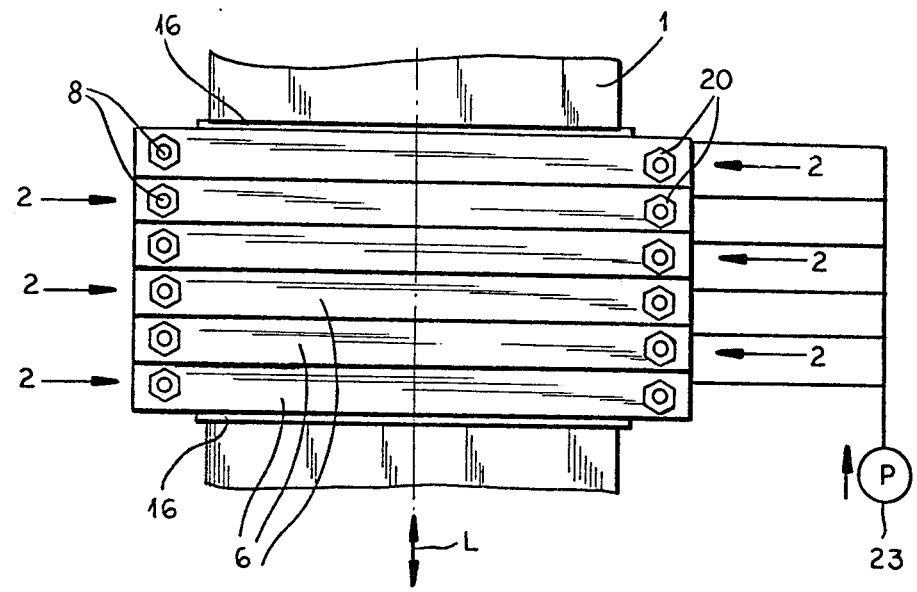
FIG. 2 is a top view of the press of this invention.
Figure 3:
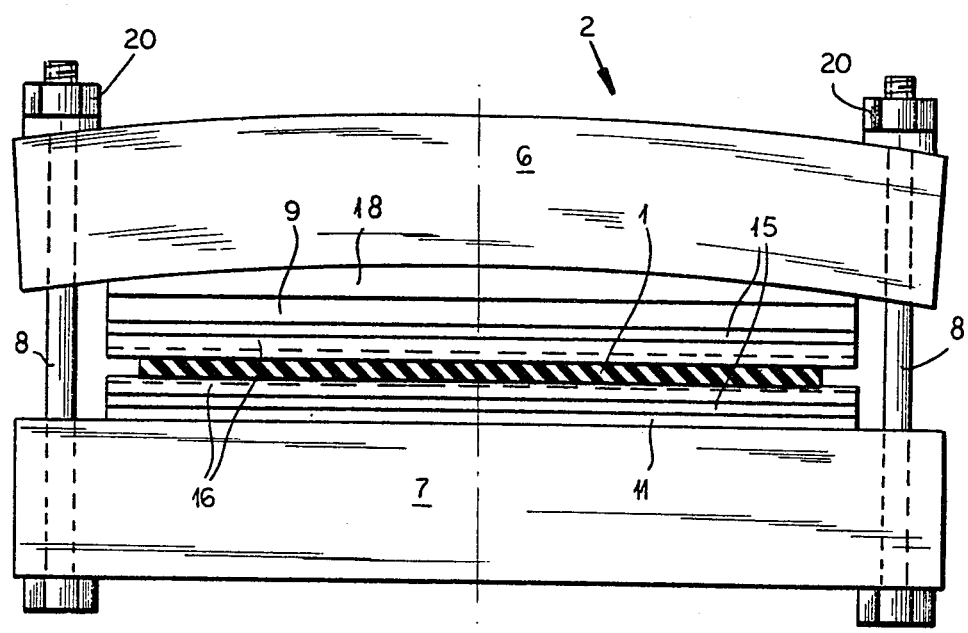
FIG. 3 is an end view of the press of the present invention.

As seen in FIGS. 1 through 3, a press according to this invention is formed of two or more identical and upright press frames 2 all aligned in a longitudinal direction L abutting one another. In this manner it is possible to make a press of any desired length.

Each frame comprises rectangular-section box-beam traverses 6 and 7 that extend horizontally transverse to the direction L. Tie-rod bolts 8 with nuts 20 pass through the outer ends of the traverses 6 and 7 and solidly prevent them from moving vertically apart. These traverses 6 and 7 respectively bear upward and downward against upper and lower force-transmitting pressure plates or bars 9 and 11 on respective press platens 3 and 4. Identical heater bars 15 are provided between each pressing bar 9 and 11 and the respective press platen 3. One of the bars 9 and 11, here the upper bar 9, bears via a hydraulic actuator 10 and a bend-compensating bar 18 of standard construction on the respective traverse, here the upper traverse 6.

As plainly visible from FIG. 1 the platens 3 and 4 are here merely made of sheet metal, and have turned up ends 16 that prevent them from being longitudinally displaced by the belt 1 that the press according to this invention serves to repair. The bars 9 and 11 are much thicker and, therefore, much more rigid.

The bars 15 each incorporate a heater 5 of the type described in above cited U.S. patent application No. 329,571 filed Dec. 10, 1981 by C. Fudickar now U.S. Pat No. 4,426,573. Such a heater comprises an electrically nonconducting support bar 21 having a pair of opposite faces and formed with a plurality of through-going holes opening at the faces, respective electrically energizable heating capsules 14 in the holes and each having one end exposed at one of the faces and an opposite end exposed at the other of the faces, and a pair of respective but here unillustrated conductors lying on the faces in electrical contact with the respective exposed ends of the capsules 14. A tight hermetic skin surrounds and encapsulates the body with the capsules in the holes and the conductors on the faces and a pair of respective but also unillustrated wires extend through the skin to the conductors serves for passing electricity through the heating capsules. The heating capsules are of an automatically self-temperature-stabilizing PTC ceramic whose resistance increases as its temperature rises to a predetermined level.

Such a heating element 5 is flexible and is fitted in a passage 22 extending transverse to the direction L through the respective bar 15, and is flexible enough that it can follow any normal bending or deformation of the respective bar. Further details about this style of heater can be obtained from the above-cited patent document.

The actuator 10 is here constituted much as described in U.S. Pat. Nos. 4,393,766 and 4,423,674 as well as in copending patent application Ser. No. 326,892 of P. Thies (now U.S. Pat. No. 4,388,860). The pressing bar 9 is of U-section with a flat base 13 that bears via the respective heater bar 15 on the upper platen 3 and a pair of sides 12 that flank and laterally contain the actuator, which is formed of two hoses 17 defining chambers 19. All the chambers 19 of one press are connected together to a common pump 23 (FIG. 2) so the entire press exerts the same pressure on the workpiece 1. The hoses are diametrally compressible but circumferentially unstretchable and have in uncompressed condition a predetermined hose diameter although they are partially flattened between the plate and the confronting traverse face in use.

Such an arrangement is very simple and yet allows a press of any size to be put together. Pressing will be accurately controlled, and even pressure across the workpiece will be assured.

We claim:
1. A press for joining or repairing a wide flat belt, the press being formed of a longitudinal row of upright and abutting press frames each comprising:
   upper and lower traverses respectively having lower and upper traverse faces;
   two upright tie bolts extending vertically between the upper and lower traverses and securing the lower traverse to the upper traverse;
   upper and lower relatively thin press platens carried on and between the traverses and having respective upper and lower platen faces respectively confronting the lower and upper traverse faces, the belt to be joined or repaired being directly engageable between the platens;
   respective upper and lower relatively thick and rigid pressure plates operatively engaged between the platen faces and the respective traverse faces;
   means including respective upper and lower heaters provided on the pressure plates for heating same; and
   hydraulic actuating means engaged between the upper traverse and the upper pressure plate and vertically expansible for displacing the upper pressure plate down and thereby pressing the platens against the belt engaged therebetween.

2. The belt press defined in claim 1 wherein the upper pressure plate is of U-section and upwardly open with a base operatively bearing on the upper face of the upper platen and a pair of sides projecting upward therefrom, the actuating means being between the pressure-plate sides.

3. The belt press defined in claim 1 wherein the hydraulic actuating means includes at least one diametrally compressible but circumferentially unstretchable hydraulic hose forming a substantially closed chamber and lying between the pressure-plate sides.

4. The belt press defined in claim 3 wherein the hoses extend parallel to the respective traverses and transverse to the row of frames.

5. The belt press defined in claim 3 wherein the hoses of each of the upper pressure plates engage each other laterally.

6. The belt press defined in claim 3, further comprising
   pump means connected to all of the chambers for pressurizing same.

7. The belt press defined in claim 1 wherein each of the pressure plates is provided with a heating bar in which the respective heater is contained.

8. The belt press defined in claim 1 wherein the platens are of sheet metal.

9. The belt press defined in claim 8 wherein the platens have bent ends engaging horizontally against a frame at the end of the row of frames.

10. The belt press defined in claim 1 wherein each of the pressure plates includes a heating bar in which the respective heater is contained, each pressure plate with the respective heating bar being at least four times thicker, measured vertically, than the respective platen.

11. The belt press defined in claim 1 wherein the hydraulic actuating means includes
    at least one diametrally compressible but circumferentially unstretchable hydraulic hose forming a substantially closed chamber and lying between the pressure-plate sides; and a body partially of an incompressible liquid and partially of a compressible gas filling the hose.

12. The belt press defined in claim 1 wherein the heaters are provided with temperature self-regulating heating capsules.

13. The belt press defined in claim 12 wherein the heaters includes elongated heater bodies in which the capsules are imbedded and the pressure plates each include a rigid heater bar having a throughgoing passage receiving the respective heater bodies are fitted.

14. The belt press defined in claim 1, further comprising a bend-compensating element having a pair of nonparallel upper and lower surfaces and engaged between the upper platen face and the lower traverse faces.

15. A press for joining or repairing a wide flat belt, the press comprising:

upper and lower relatively thin and continuous press platens extending longitudinally completely through the press and having respective upper and lower platen faces, the belt to be joined or repaired being directly engageable between the platens; and a longitudinal row of upright and abutting press frames each having upper and lower traverses respectively having lower and upper traverse faces respectively confronting the upper and lower platen faces;

two upright tie bolts extending vertically between the upper and lower traverses and securing the lower traverse to the upper traverse;

respective upper and lower relatively thick and rigid pressure plates engaged between the platen faces and the respective traverse faces;

means including respective upper and lower heaters provided on the pressure plates for heating same; and hydraulic actuating means engaged between the upper traverse and the upper pressure plate and vertically expansible for displacing the upper pressure plate down and thereby pressing the platens against a belt engaged therebetween.

16. The belt press defined in claim 15 wherein each of the platens has longitudinal ends protruding longitudinally from the press and bent away from the other platen.

* * * * *